(12) United States Patent
Lu

(10) Patent No.: US 7,557,980 B2
(45) Date of Patent: Jul. 7, 2009

(54) OPTICAL PATH SWITCHING DEVICE

(75) Inventor: Kevin Lu, Taipei (TW)

(73) Assignee: Inventec Multimedia & Telecom (Tianjin) Co., Ltd. (CN)

( * ) Notice: Subject to any disclaimer, the term of this patent is extended or adjusted under 35 U.S.C. 154(b) by 23 days.

(21) Appl. No.: 11/898,819

(22) Filed: Sep. 17, 2007

(65) Prior Publication Data
US 2009/0073546 A1   Mar. 19, 2009

(51) Int. Cl.
*G02F 1/03* (2006.01)
*G02F 1/295* (2006.01)

(52) U.S. Cl. .................. 359/263; 359/245; 385/9

(58) Field of Classification Search .................. 359/245, 359/250, 252, 259, 263; 385/8, 9, 16
See application file for complete search history.

(56) References Cited

U.S. PATENT DOCUMENTS

2003/0063363 A1*   4/2003   Romanovsky ............... 359/245

* cited by examiner

*Primary Examiner*—William C Choi
(74) *Attorney, Agent, or Firm*—Bacon & Thomas, PLLC

(57) ABSTRACT

An optical path switching device is provided. The optical path switching device utilizes the electro-optic effect to apply an electric field on different reflective elements without moving an input/output end of optical signal or reflective elements. Thus, the reflective elements reflect optical beams to control travel paths of the optical beams, so as to switch the optical paths in the absence of mechanical motion.

8 Claims, 11 Drawing Sheets

FIG. 10

| | 1 | 2 | 3 | 4 | 5 | 6 | 7 | 8 |
|---|---|---|---|---|---|---|---|---|
| A | | | Reflective | | | | | |
| B | | Reflective | | | | | | |
| C | | Reflective | Reflective | Reflective | | | | |
| D | | | | Reflective | | | Reflective | |
| E | | | | | | Reflective | | Reflective |
| F | | Reflective | Reflective | Reflective | | Reflective | | |
| G | | | | | | Reflective | | Reflective |

Output Light Collimator Numbers

Reflective Element Numbers

OPTICAL PATH SWITCHING DEVICE

BACKGROUND OF THE INVENTION

1. Field of Invention

The present invention relates to an optical path switching device, which utilizes an electric field to drive and control applying electricity on the different reflective elements without moving an input/output end of optical signal or reflective elements, so as to control a travel path of an optical beam to switch the optical path.

2. Related Art

With the development of optical communication network technology, the conventional method of exchanging or routing optical signals depending on high-speed electronic elements has been gradually replaced by processing the optical signals in the optical field to the maximum extent. In other words, through the entire processing, instead of converting the optical signals to electric signals, the optical signals are directly processed to improve the processing speed, and maintain the transparent to light. It can be known from the above that the optical path switching device used as the core for exchanging in the optical field certainly will play a more important role in the future.

The optical path switching device is an device for switching optical signals input from an input port to a destination output port, which can be used in the core technology of all-optical exchange such as in optical cross connect (OXC) and optical add & drop multiplexer (OADM) systems of optical communication network nodes to perform the function of exchanging or routing.

Currently, various types of optical path switching devices are available in the market. In early years, the devices of mechanical type, which use step motors or other mechanical power to move optical fibers, mirrors, or other elements to change the optical paths, monopolize the market. These devices are featured in low crosstalk and low insertion loss, but cannot be easily integrated with other optical communication elements and have low switching speeds and short lifespan, so these devices cannot meet the requirements of the optical communication network gradually. Currently, the micro-electro-mechanical optical path switching devices become the mainstream products, in which a semiconductor material such as silicon is used to engrave micro-electro-mechanical structures, which among others, mainly are micro movable mirror array architecture using actuators to control positions of the reflective elements, such that the reflective elements enter or depart from the optical signal path of the output/input end to achieve the object of optical path switching.

A micro-electro-mechanical 1×2 optical path switching device is given below to illustrate the operating principles of the micro-electro-mechanical optical path switching device. The architecture of the device is as shown in FIGS. 1 and 2. The micro-electro-mechanical 1×2 optical path switching device 100 is composed of an input light collimator 101, a first output light collimator 102, a second output light collimator 103, an actuator control device 104, and a reflective element 105. The micro-electro-mechanical 1×2 optical path switching device is assumed to have an original state as shown FIG. 1, the input light source is directly incident into the first output light collimator 102 to form a first optical path 102. FIG. 2 is a schematic view illustrating the state after the actuator control device 104 of the micro-electro-mechanical 1×2 optical switching device controls the reflective element 105 to enter the input light source. At this time, the input light source is reflected by the reflective element 105 to the second output light collimator 103 to form a second optical path 201. Thus, the switching of the optical path of the input light source is achieved.

In addition, in order to reduce the times that the input light source is reflected by the reflective element, the reflective element can also adopt a manner of moving upward and downward, or rotating in any direction, which can be classified into 2D and 3D array architecture. In the 2D array architecture, the reflective mirror just moves upward and downward simply. When the reflective mirror moves downward, the light can pass through. Otherwise, the light beam will be reflected to a destination output port. In the 3D array architecture, the reflective mirror can rotate in any direction. However, this method requires very precise control over the rest position of the reflective mirror.

The conventional art mainly uses the mechanical motion as the main technical means to realize the control. However, long-term movement often causes deformation of the structure and damages to the material, and the shock in the movement and transportation will reduce the reliability, which will lead to inaccuracy of the control eventually. Moreover, the optical path switching device is also limited by the moving space required by the mechanical motions, so the volume of the device cannot be further reduced.

In view of the problems of the conventional art, the inventor of the present invention provides an optical path switching device utilizing the electro-optic effect to eliminate the dependence of the conventional optical path switching device on the mechanical motions.

SUMMARY OF THE INVENTION

In view of the above problems, the present invention is directed to providing an optical path switching device, which takes advantage of an electro-optic effect that can change an refractive index of an electro-optic material after an electric field is applied thereon without moving an input/output end of optical signal or reflective elements, such that an input light source is reflected or transmitted by a reflective element coated with the electro-optical material depending on whether an electric field is provided, thereby achieving the object of changing an optical path of the input light source.

The present invention provides an optical path switching device, including an input port, at least one reflective element, an electric field driver, and more than one output port. The reflective elements form a reflective element array based on different arrangements. When an input light source is incident into the reflective element array from the input port, the electric field driver applies an electric field on different reflective element in the reflective element array according to different optical paths, so as to reflect the input light source to achieve the control of the optical paths. Thus, the problem that the reliability of the optical path switching device mainly utilizing mechanical motions is reduced because of deformation of the structure and damages of the material after long-term movement or shock in the movement or transportation can be solved. Meanwhile, the movement space for mechanical motions is saved, so the volume of the optical path switching device is reduced greatly.

As for features and examples of the present invention, preferred embodiments will be illustrated in detail with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 9, 10, and 11 are schematic views of an optical path switching device according to the third embodiment of the present invention.

DETAILED DESCRIPTION OF THE INVENTION

The present invention provides an optical path switching device, which utilizes the electro-optic effect that can change the refractive index of the electro-optic material after an electric field is applied thereon without moving an input/output end or a reflective element of optical signals, such that the input light source is reflected or transmitted by the reflective element coated with the electro-optic material, so as to change an optical path of the input light source.

An optical path switching device provided by the present invention includes an input port, at least one reflective element, an electric field driver, and more than one input port. The input port is an optical collimator, and is defined as an input light collimator. The at least one reflective element forms a reflective element array based on different arrangements, and is a semiconductor glass-ceramic film having one side coated with an electro-optic material prepared by an RF-sputtering, evaporation or sol-gel method. The electric field driver is used to apply an electric field on the reflective element, such that the reflective element with the electric field applied thereon transits from a transmissive state to a reflective state, and reflects the input light source when under the input light source. The output ports are also optical collimators, and are defined as output light collimators. The input light source is reflected or transmitted to the output light collimators by the reflective elements for at least one time, and the output light collimators are corresponding to the semiconductor glass-ceramic film or the input light collimator, and the corresponding elements can further include other reflective elements in-between. The influence of the reflective element coated with the electro-optic material on the input light source before and after the electric field is applied is described as follows with reference to the accompanying drawings, and three embodiments are given below to illustrate the operating manner of the optical path switching device of the present invention.

Figure 1:
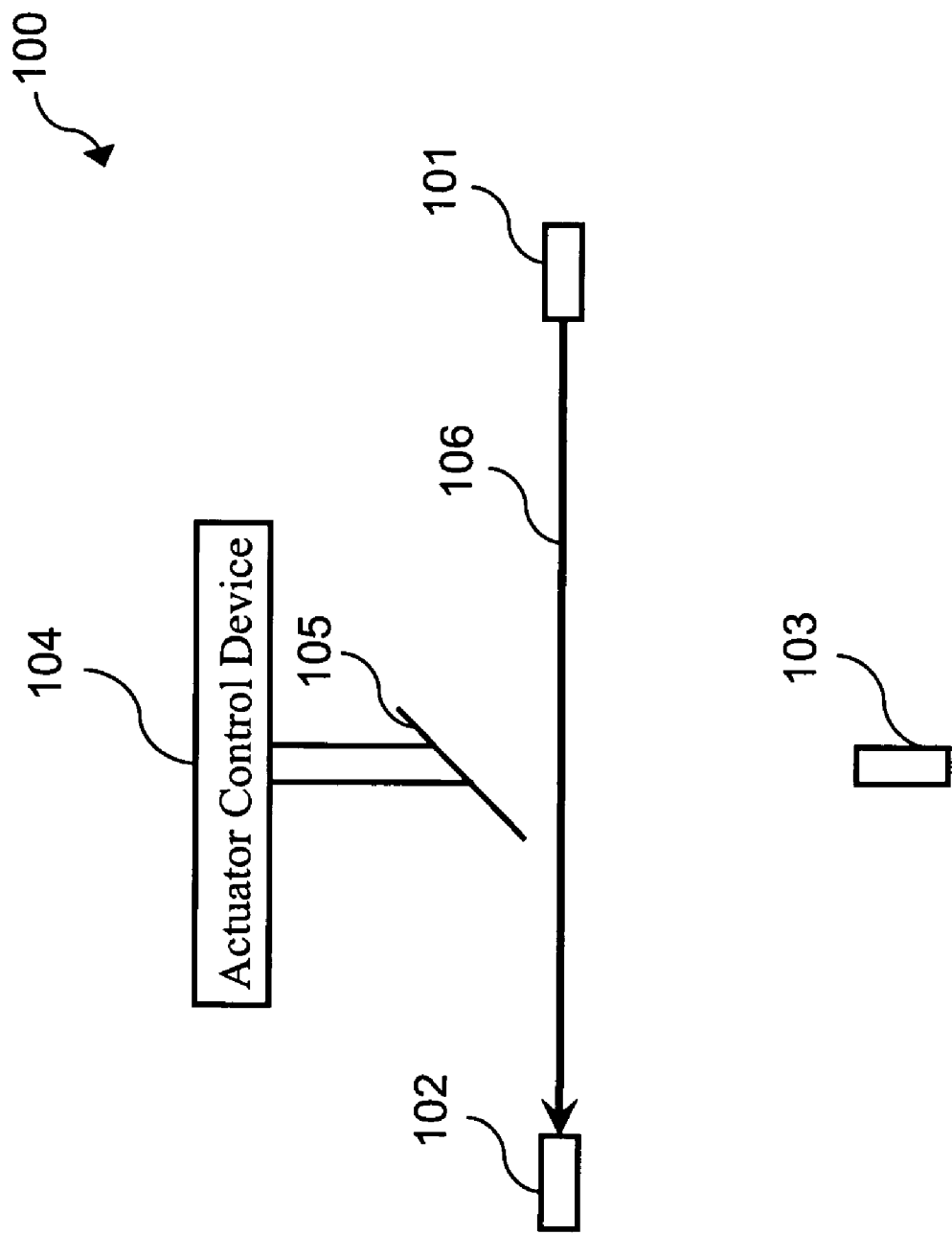
FIGS. 1 and 2 are schematic views illustrating a continuous operation of optical path switching performed by a conventional micro-electro-mechanical 1×2 optical path switching device.
Figure 2:
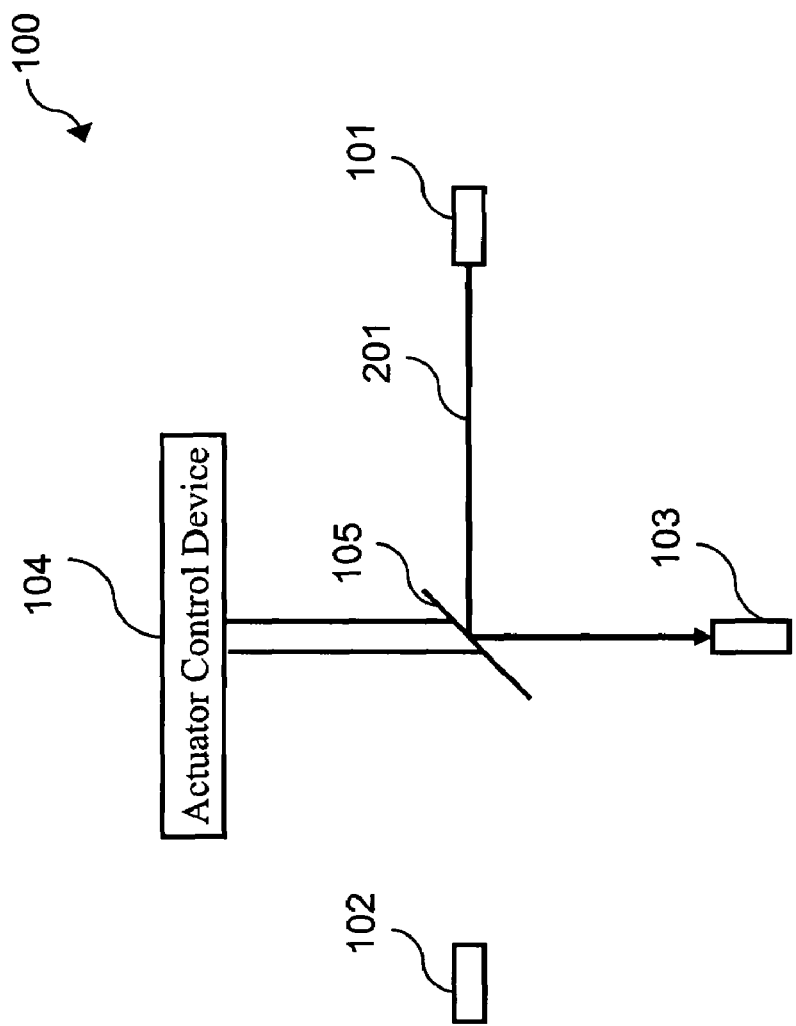
Figure 3:
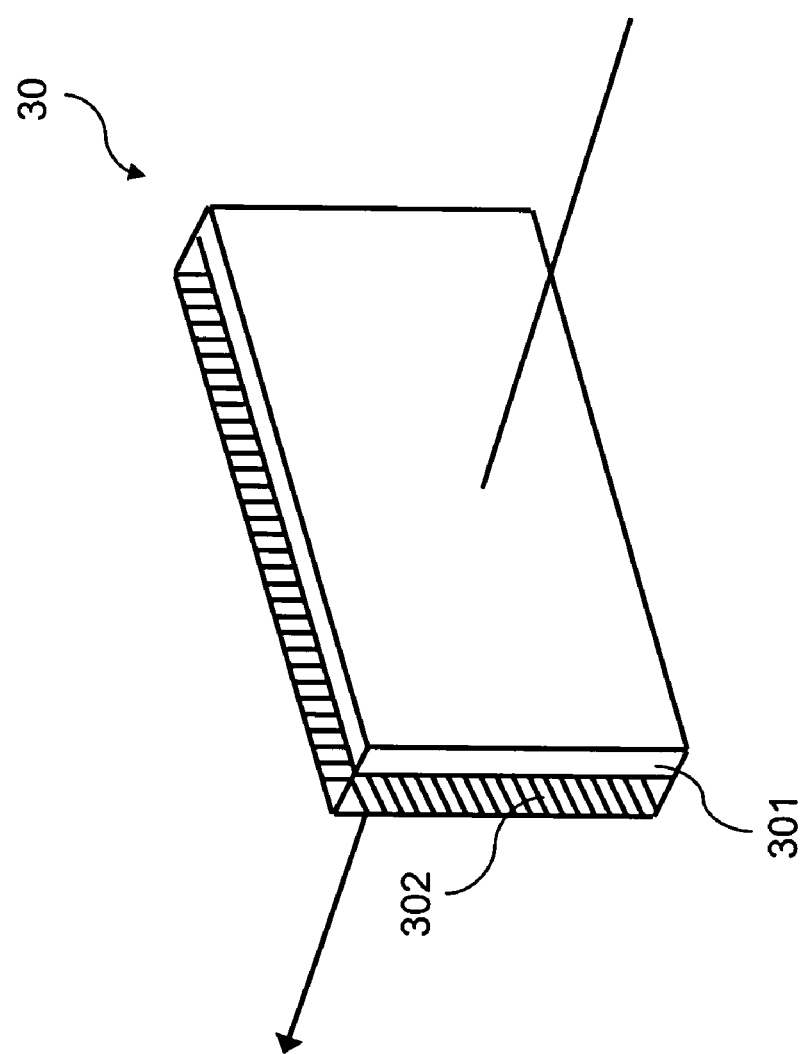
FIG. 3 is a schematic view of a conventional reflective element.
Figure 4:
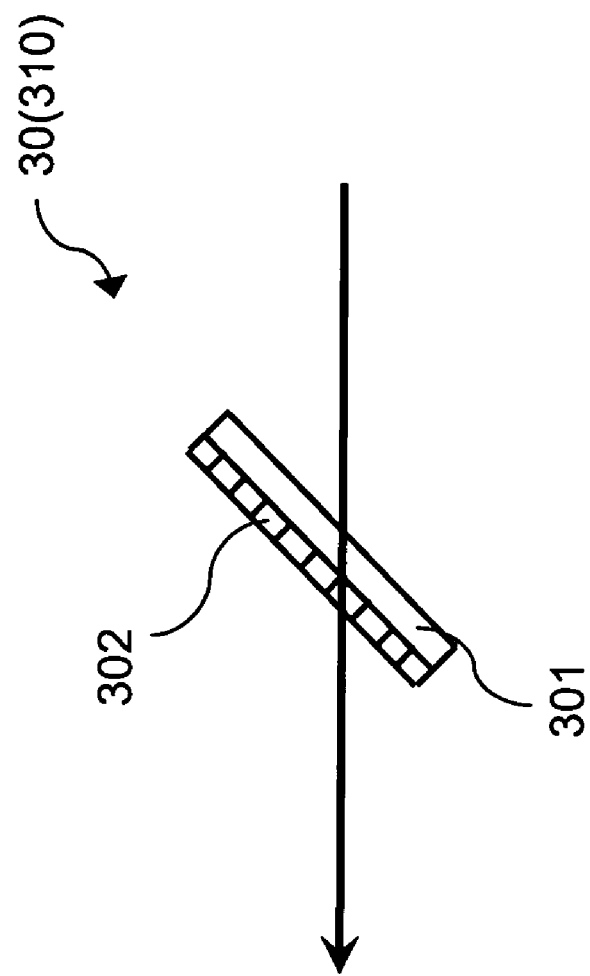
FIG. 4 is a schematic view of an optical path of a conventional reflective element in the absence of an electric field.
Figure 5:
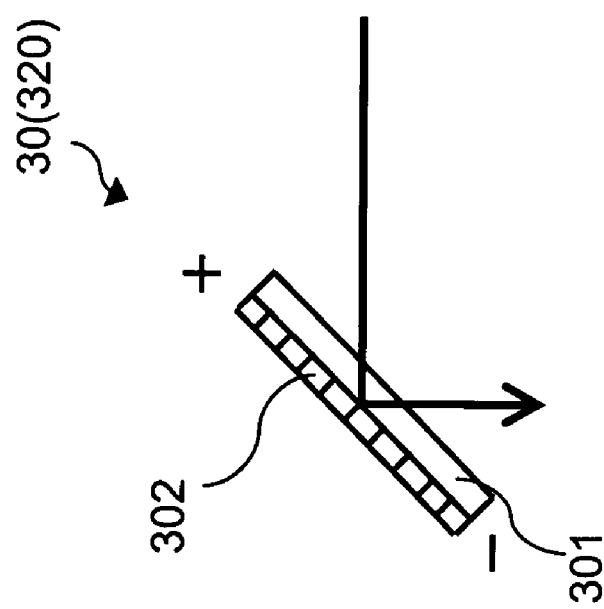
FIG. 5 is a schematic view of the optical path of a conventional reflective element with an electric field applied thereon.

FIG. 3 is a schematic view of a reflective element. Referring to FIG. 3, the reflective element 30 includes a semiconductor glass-ceramic film 301 and an electro-optic material 302. The electro-optic material is coated on one side of the semiconductor glass-ceramic film 301, so as to form the reflective element with the electro-optic effect. The semiconductor glass-ceramic film mainly includes a material of silicon dioxide, and is prepared by the RF-sputtering, evaporation, and sol-gel methods. FIG. 4 is a schematic view of the reflective element 30 in the absence of the electric field. When the electric field is not applied on the reflective element 30, the input light source is transmitted through the reflective element 30(310). When it intends to switch the optical path, the electric field is applied on the reflective element 30. FIG. 5 is a schematic view of an optical path after the electric field is applied on the reflective element 30. The input light source is reflected by the reflective element 30(320) with the electric field applied thereon.

As the present invention uses the electro-optic effect instead of the mechanical motions, the problem that the reliability of the optical path switching device mainly using mechanical motions is reduced because of deformation of the structure and damages of the material after long-term movement or shock in the movement or transportation can be solved. Meanwhile, the movement space for mechanical motions is saved, so the volume of the optical path switching device is reduced greatly. Then, three embodiments are given below to illustrate the operating manner of the optical path switching device of the present invention.

Figure 6:
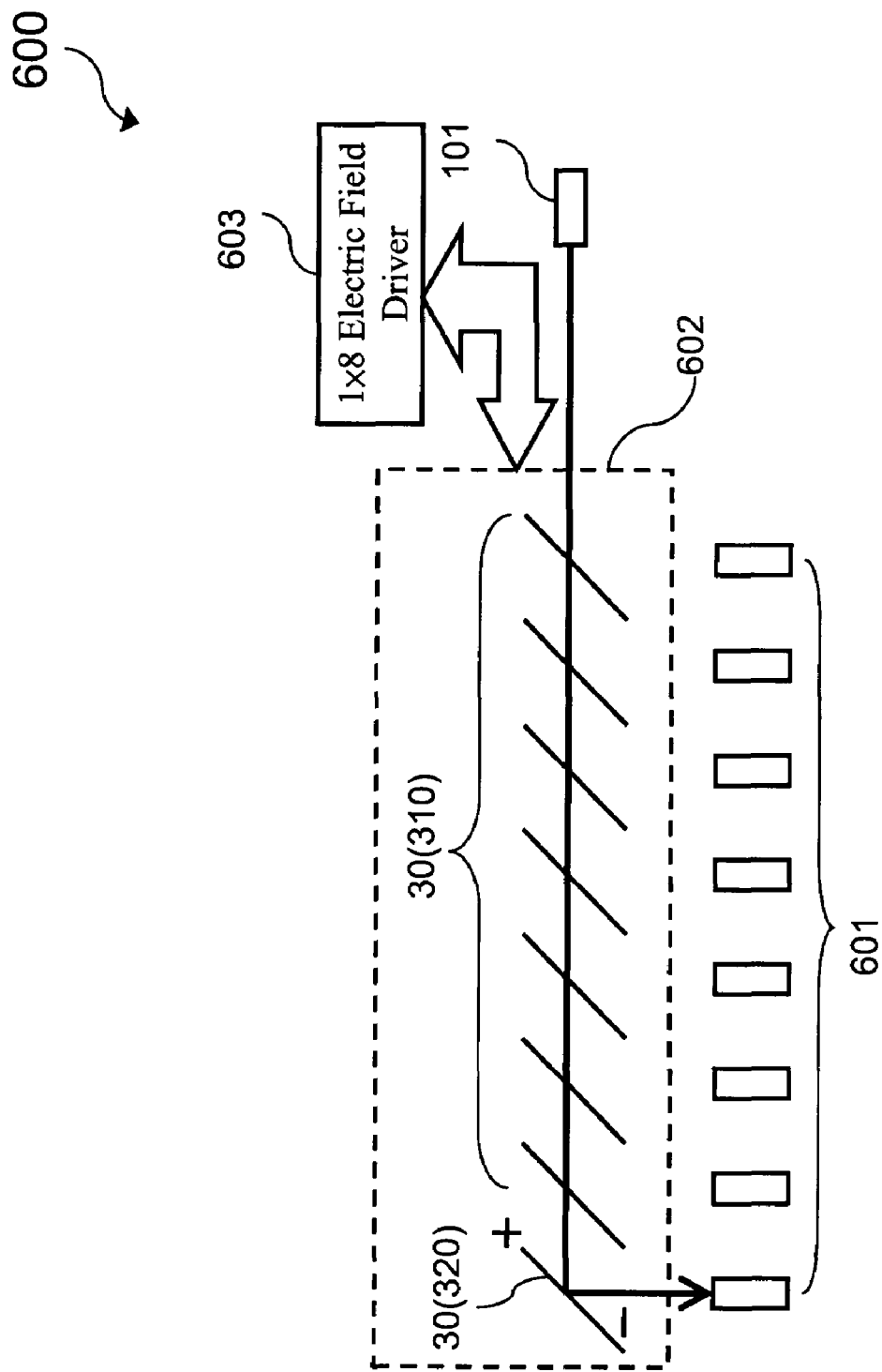
FIG. 6 is a schematic view of an optical path switching device according to the first embodiment of the present invention.

FIG. 6 is a schematic view of an optical path switching device according to the first embodiment, which is an implementation aspect that the present invention is applied in a 1×8 optical path switching device 600. The 1×8 optical path switching device 600 includes an input light collimator 101, output light collimators 601, a 1×8 reflective element array 602, and a 1×8 electric field driver 603. The 1×8 reflective element array 602 is formed by reflective elements arranged in parallel or vertically and spaced by an appropriate distance. After the optical path is determined, the 1×8 electric field driver 603 applies an electric field on the reflective element 30(320) requiring transiting to the reflective state, and the rest reflective elements 30(310) remain in the transmissive state of not being applied with the electric field. At this time, after the input light source is input into the 1×8 reflective element module 602 via the optical collimator 101, the input light source is transmitted by the reflective elements 30(310) without being applied with the electric field, and is reflected to the corresponding output light collimator 601 by the reflective element 30(320) with the electric field applied thereon. In the embodiment of the 1×8 optical path switching device 600, the entire process of optical path switching is independent from the mechanical motions, and only uses the 1×8 electric field driver 603 to apply the electric field on different reflective elements in the 1×8 reflective element array 602, so as to achieve the object of optical path switching by reflecting the input light source. Here, the input light source passes through seven reflective elements 30(310) at most, and is reflected by the reflective element 30(320) with the electric field applied thereon for once.

The signals of the input light source are attenuated as passing through the reflective elements 30(310) and the reflective element 30(320) with the electric field applied thereon, and the degree of attenuation increases with the number of elements that the input light source passes through. Therefore, the number of the reflective elements that the input light source passes through and the times that the light source is reflected by the reflective element must be taken into consideration. In order to meet such requirement, the technical content of the present invention also includes changing the arrangement of the reflective elements and using the electric field driver together to apply the electric field on different reflective elements at the same time, so as to reduce the number of the reflective elements and the times the reflective element reflects the light source. Thus, the degree of attenuation of the light source signals is reduced, and the moving space for the mechanical motions is saved, thereby reducing the volume of the optical path switching device substantially. Hereinafter, two embodiments will be given below for further illustration.

Figure 7:
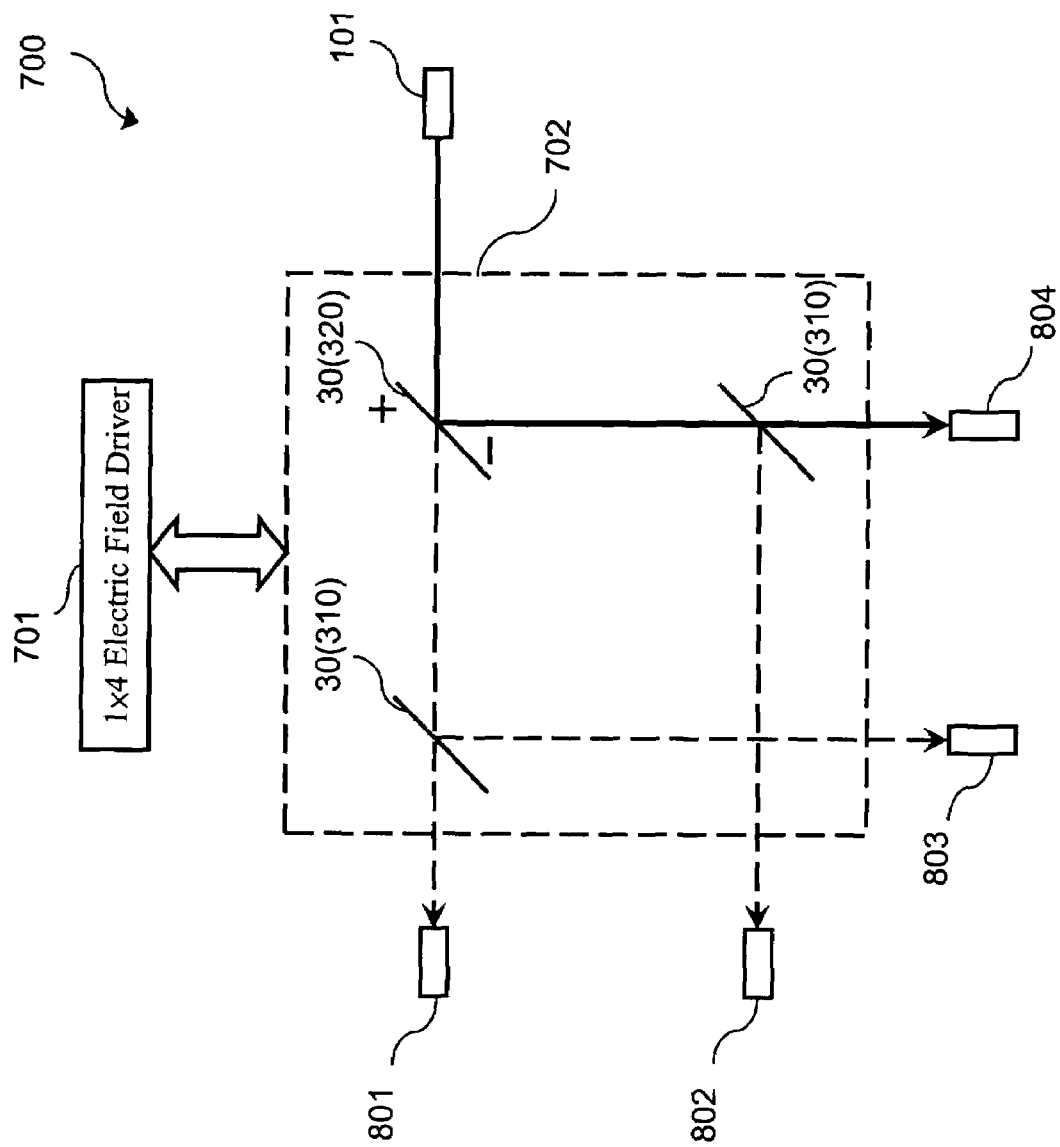
FIGS. 7 and 8 are schematic views of optical path switching performed by an optical path switching device according to the second embodiment of the present invention.
Figure 8:
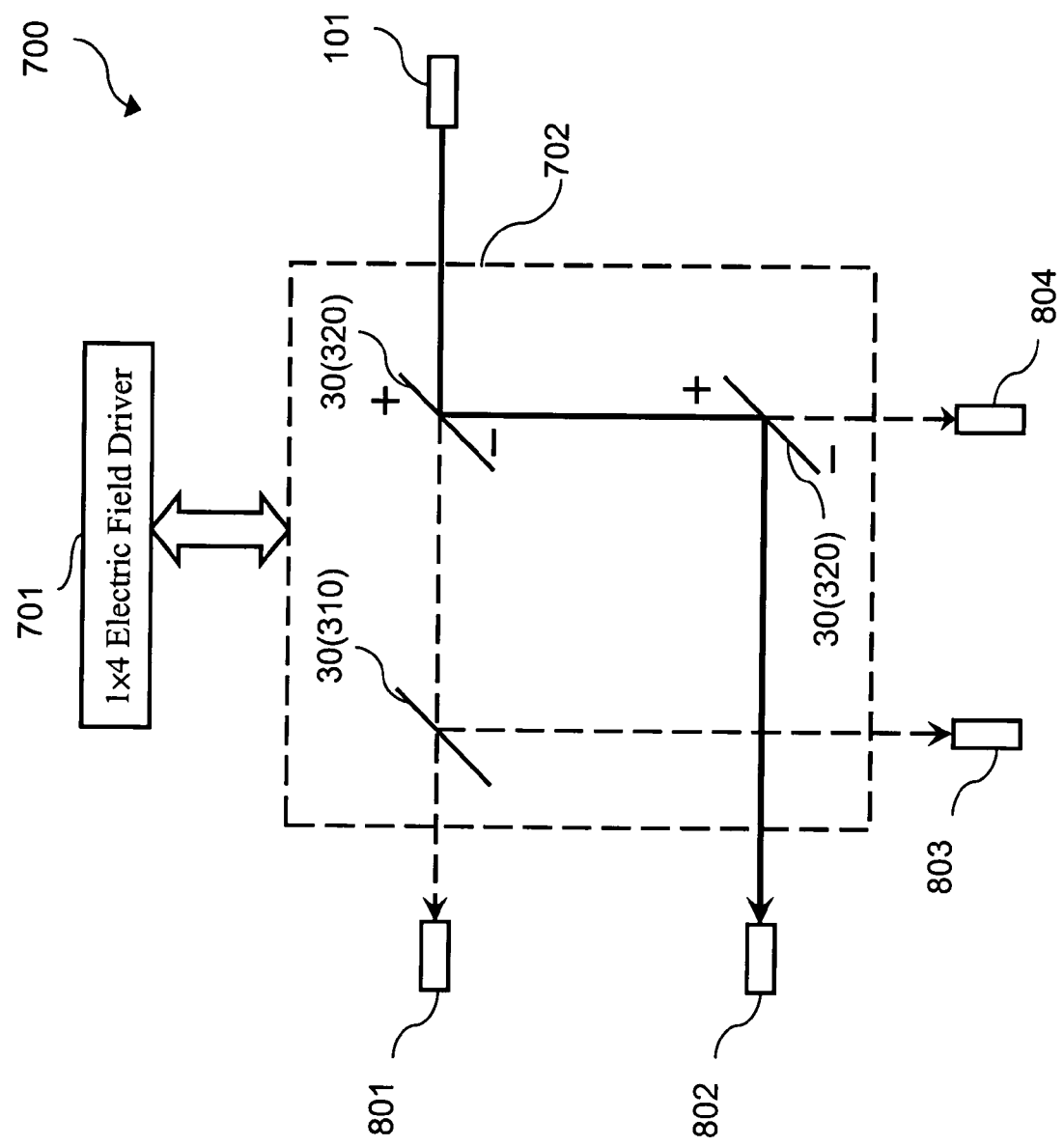

FIGS. 7 and 8 are schematic views of an optical path switching device according to the second embodiment of the present invention. Referring to FIGS. 7 and 8, a 1×4 optical path switching device 700 includes an input light collimator 101, a 1×4 reflective element array 702, a 1×4 electric field driver 701, a first output light collimator 801, a second output light collimator 802, a third output light collimator 803, and a fourth output light collimator 804. The 1×4 reflective element array 702 is formed by reflective elements arranged in parallel or vertically and spaced at an appropriate distance. When it intends to make the input light source irradiated into the fourth output light collimator 804 via the input light collimator 101, the 1×4 electric field driver 701 applies the electric field on a selected reflective element, such that the selected reflective element 30(320) with the electric field applied thereon transits into the reflective state, and the rest reflective elements 30(310) without being applied with the electric field remain at the transmissive state. At this time, after the input light source is input into the 1×4 reflective element array 702 via the optical collimator 101, the input light source is reflected by the reflective element 30(320) with the electric field applied thereon, and passes through the reflective elements 30(310) without being applied with the electric field to reach the fourth output light collimator 804.

Referring to FIG. 8, when it intends to make the input light source irradiated into the second output light collimator 802 via the input light collimator 101, the 1×4 electric field driver 701 applies the electric field on the selected reflective elements, such that the selected reflective elements 30(320) transit into the reflective state, and the rest reflective elements 30(310) without being applied with the electric field remain at the transmissive state. Thus, the input light source is reflected twice by two reflective elements 30(320) with the electric field applied thereon to reach the second output light collimator 802. When it intends to make the input light source irradiated into the first output light collimator 801 or the third output light collimator 803 via the input light collimator 101, the difference as compared with the above description only lies in that the electric field is applied on a different element and whether the electric field is applied or not, so the details will not be described herein again.

In the embodiment of the 1×4 optical path switching device 700, the reflective elements and the output light collimators are arranged in an arrangement in FIG. 8. The 1×4 reflective element array 702 only needs three reflective elements 30(310) to enable the optical path to have four variations, and the input light source needs to pass through two reflective elements 30(310) at most or be reflected by the reflective elements 30(320) with the electric field applied thereon for twice at most. According to the arrangement of the reflective elements and the output light collimators of the first embodiment, four reflective elements must be used to achieve the 1×4 optical path switching, so the degree of attenuation of the input light source and the number of the reflective elements of the first embodiment are higher than those of this embodiment.

Figure 9:
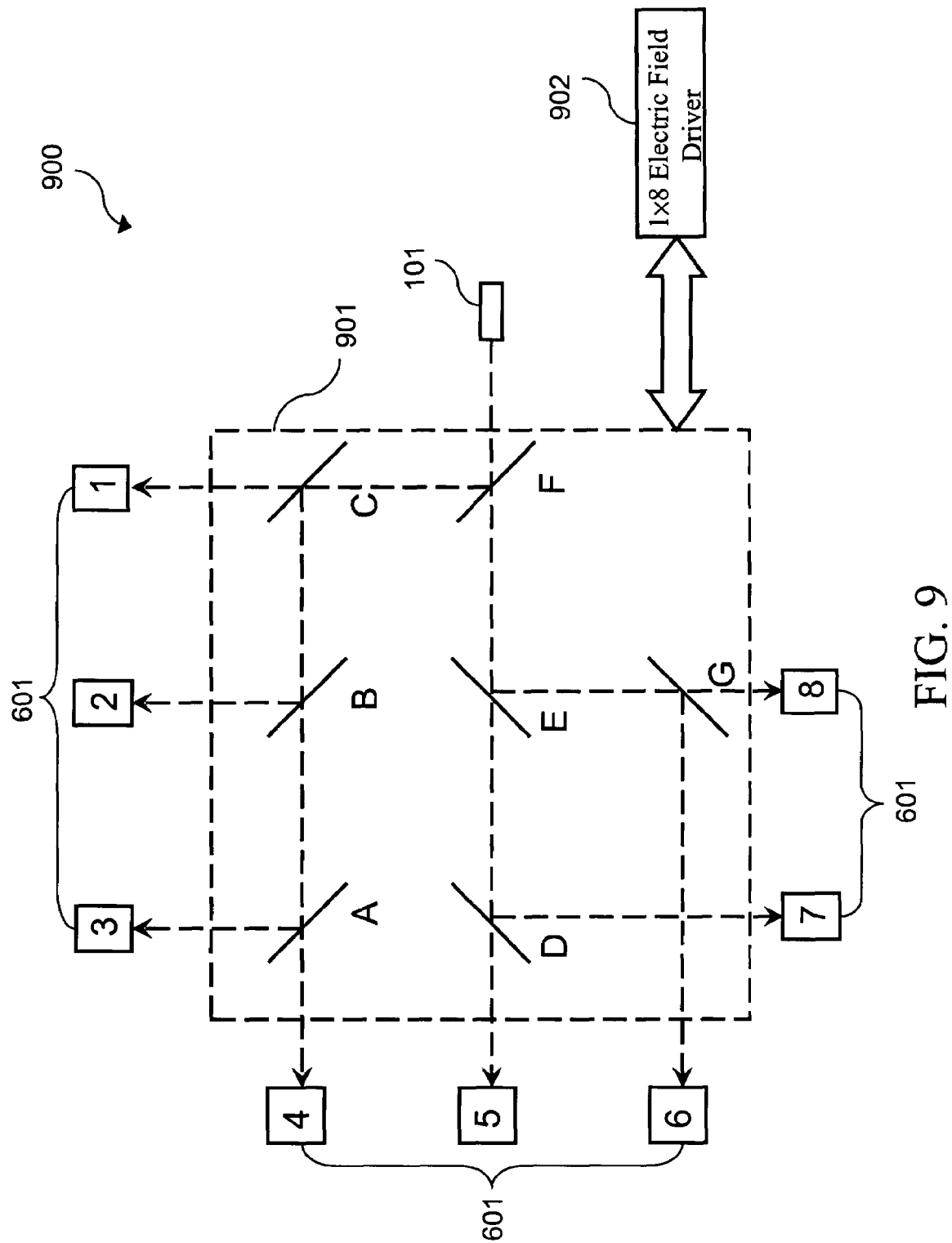
Figure 11:
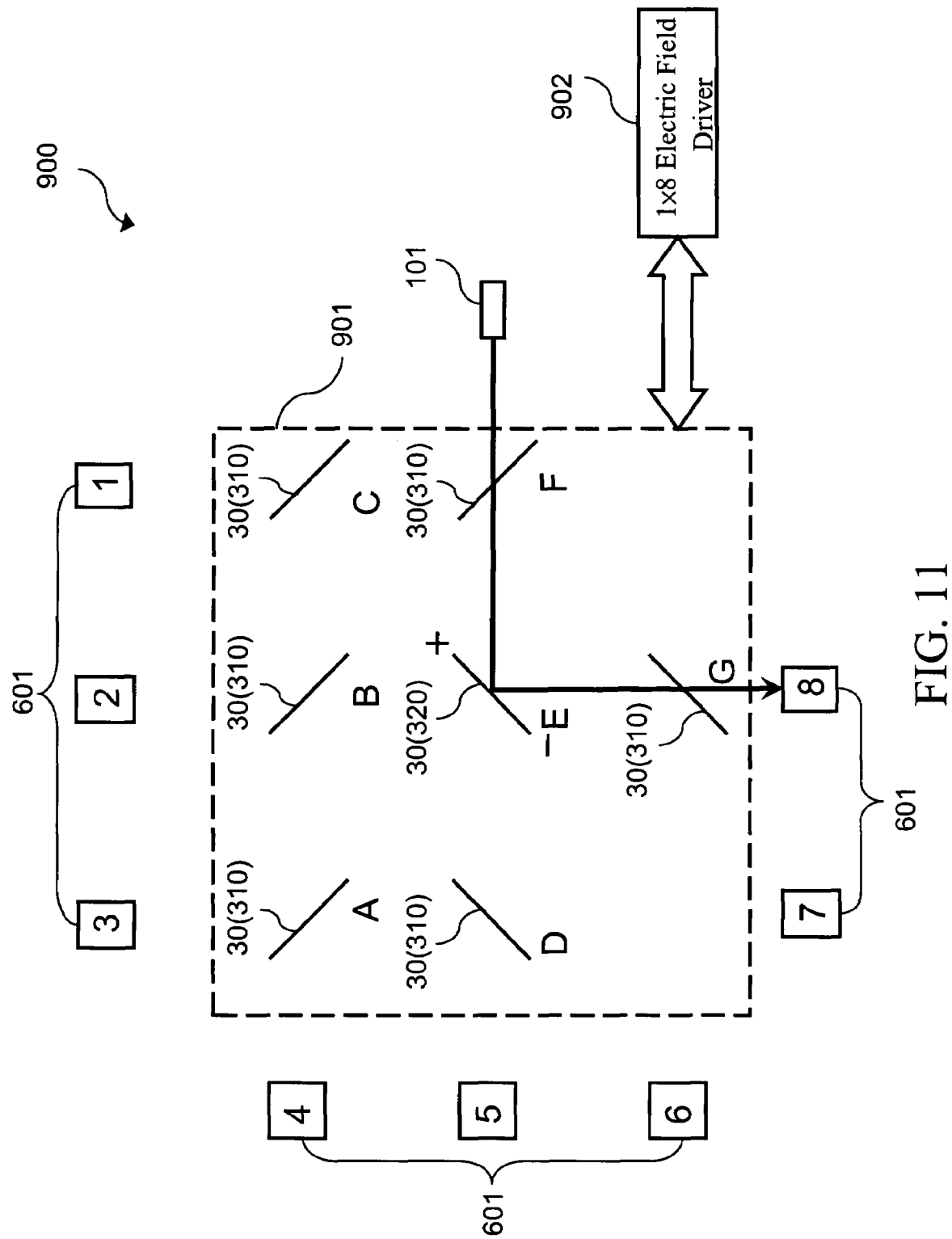

Then, the schematic views of the third embodiment of the optical path switching device of the present invention are shown to illustrate the switching control between different optical paths in the 1×8 optical path switching device. Referring to FIGS. 9, 10, and 11, the 1×8 optical path switching device 900 includes an input light collimator 101, a 1×8 reflective element array 901, a 1×8 electric field 902, and output light collimators 601. The 1×8 reflective element array 901 is formed by the reflective elements arranged in parallel or vertically and spaced at an appropriate distance. The reflective elements are indicated by A, B, C, D, E, F, and G respectively, and the eight output light collimators are indicated by numbers 1, 2, 3, 4, 5, 6, 7, and 8 respectively. The correspondence between the output light collimators 601 and the states of the reflective elements in the 1×8 reflective element array 901 is as shown in FIG. 10. The correspondence table 950 between the states of the reflective elements and the output light collimators includes the output light collimator numbers 951, the reflective element numbers 952, and the reflective element states 953. The reflective element states 953 include the transmissive state and the reflective state. The unmarked state in the table is the transmissive state. In order to enable an optical signal to be output to the output light collimator numbered 1, the 1×8 electric field 902 must apply the electric field on the reflective element numbered F, such that the reflective element numbered F transits into the reflective state from the transmissive state. In order to enable an optical signal to be output to the output light collimator numbered 2, the 1×8 electric field 902 must apply the electric field on the reflective elements numbered B, C, and F at the same time, such that the reflective elements numbered B, C, and F transit into the reflective state from the transmissive state. The details of outputting the optical path to other output light collimators can be derived from the above description, and will not be described herein again.

Referring to FIGS. 10 and 11, when it intends to make the optical signal output through the output light collimator numbered 8, it is known from the correspondence table 950 between the states of the reflective elements and the output light collimators that the 1×8 electric field 902 applies the electric field 30(320) on the reflective element numbered E, such that the reflective element numbered E transits into the reflective state 954. At this time, after the input light source is input into the 1×8 reflective element module 901 via the input light collimator 101, the input light source passes through the reflective element 30(310) numbered F without being applied with the electric field, and is reflected by the reflective element 30(320) numbered E with the electric field applied thereon, and finally passes through the reflective element 30(310) numbered G without being applied with the electric field to reach the corresponding output light collimator 601. In this embodiment of the 1×8 optical path switching device 900, seven reflective elements 30(310) are required in the 1×8 reflective element array 901, and the input light source only needs to pass through three reflective elements 30(310) at most or be reflected by the reflective elements 30(320) with the electric field applied thereon for three times at most. Compared with the optical path switching device 600 in the first embodiment of the present invention, the number of the reflective elements is reduced in this embodiment, and the attenuation of the input light source is alleviated.

It is known from the above two embodiments that as compared with the technical means of the conventional 2D array architecture, although the present invention also uses the architecture of the reflective elements in an array to achieve the optical path switching and reduce the times that the input light source is reflected by the reflective elements, the present invention does not depend on the mechanical motions, so the moving space for the mechanical motions is saved, and the volume of the optical path switching device is reduced greatly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical path switching device, comprising:
   an input port, for receiving an external input light source;
   at least one reflective element, in a transmissive state initially, and allowing the input light source to transmit when receive the input light source;
   an electric field driver, applying an electric field on at least one of the reflective elements, such that the at least one reflective element applied with electric field transits from the transmissive state to a reflective state, and reflects the input light source when receive the input light source; and
   more than one output port, for receiving and then outputting the reflected light source wherein the reflective elements are a semiconductor glass ceramic film having an electro-optic material coated on one side, and the input light source shines on the semiconductor glass ceramic film from one side not coated with the electro-optic material.

2. The optical path switching device as claimed in claim 1, wherein the input port is an input light collimator connected with an input optical fiber.

3. The optical path switching device as claimed in claim 1, wherein the reflective elements are arranged in parallel or vertically to form a reflective element array.

4. The optical path switching device as claimed in claim 1, wherein the electro-optic material forms a reflective mirror through an electro-optic effect generated by the applied electric field, and reflects the input light source to change an optical path.

5. The optical path switching device as claimed in claim 1, wherein the semiconductor glass ceramic film is of a silicon dioxide material.

6. The optical path switching device as claimed in claim 1, wherein the semiconductor glass ceramic film is prepared by an RF-sputtering, an evaporation, or a sol-gel method.

7. The optical path switching device as claimed in claim 1, wherein the electric field driver applies the electric field on a plurality of reflective elements at the same time, such that the reflective elements assumes the reflective state at the same time, so as to control the input light source to be reflected several times.

8. The optical path switching device as claimed in claim 1, wherein the output ports are more than one output light collimators connected with output optical fibers, and each of the output light collimators is corresponding to an optical path that is formed by at least one reflection or transmission made by the reflective elements.

* * * * *